US010438297B2

(12) United States Patent
Han et al.

(10) Patent No.: US 10,438,297 B2
(45) Date of Patent: Oct. 8, 2019

(54) ANTI-MONEY LAUNDERING PLATFORM FOR MINING AND ANALYZING DATA TO IDENTIFY MONEY LAUNDERERS

(71) Applicant: Accenture Global Solutions Limited, Dublin (IE)

(72) Inventors: Jingguang Han, Dublin (IE); Md Faisal Zaman, Dublin (IE); Dadong Wan, Palatine, IL (US); Alejandro Cabello Jimenez, Dublin (IE); Esteban Collado Cespon, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 165 days.

(21) Appl. No.: 15/626,804

(22) Filed: Jun. 19, 2017

(65) Prior Publication Data

US 2018/0365773 A1 Dec. 20, 2018

(51) Int. Cl.
*G06Q 40/00* (2012.01)
*G06Q 40/02* (2012.01)
*G06Q 50/00* (2012.01)
*G06F 16/28* (2019.01)
*G06F 16/22* (2019.01)
*G06Q 10/06* (2012.01)
*G06Q 20/40* (2012.01)

(52) U.S. Cl.
CPC ......... *G06Q 40/12* (2013.12); *G06F 16/2264* (2019.01); *G06F 16/288* (2019.01); *G06Q 10/0635* (2013.01); *G06Q 20/4016* (2013.01); *G06Q 50/01* (2013.01); *G06Q 40/025* (2013.01)

(58) Field of Classification Search
USPC .......................................................... 705/30
See application file for complete search history.

(56) References Cited

U.S. PATENT DOCUMENTS 9,552,615 B2 * 1/2017 Mathura ................ G06Q 40/12
9,736,173 B2 * 8/2017 Li ........................ H04L 63/1416
(Continued)

OTHER PUBLICATIONS

Cheong et al., "Event-based Approach to Money Laundering Data Analysis and Visualization", Sep. 28, 2010, 11 pages, XP058401114.
(Continued)

*Primary Examiner* — Luna Champagne
(74) *Attorney, Agent, or Firm* — Harrity & Harrity, LLP

(57) ABSTRACT

A platform may obtain, for a first set of entities involved in a money laundering investigation, target entity information for a target entity and related entity information for a set of related entities. The platform may analyze the target entity information and the related entity information to identify money laundering candidates. The platform may determine one or more relationships indicating a degree of similarity between the target entity and the one or more related entities. The platform may generate a graph data structure that associates the target entity and the one or more related entities using the one or more relationships. The platform may determine a score for the target entity and one or more scores for the one or more related entities. The platform may provide a recommendation indicating whether the target entity and/or the one or more related entities are likely to be engaging in money laundering.

20 Claims, 10 Drawing Sheets

(56) References Cited

U.S. PATENT DOCUMENTS

| | | | |
|---|---|---|---|
| 2011/0087495 A1* | 4/2011 | O'Neill | G06Q 10/10 705/1.1 |
| 2016/0179965 A1* | 6/2016 | Bhatia | G06F 16/9535 707/749 |
| 2016/0328384 A1* | 11/2016 | Divakaran | G06F 16/9535 |
| 2017/0132636 A1 | 5/2017 | Caldera | |

OTHER PUBLICATIONS

Zhang et al., "Applying Data Mining in Investigating Money Laundering Crimes", Aug. 24-27, 2003, 6 pages, XP058082891.
Extended European Search report corresponding to EP 18 17 7961, dated Sep. 26, 2018, 11 pages \* cited by examiner

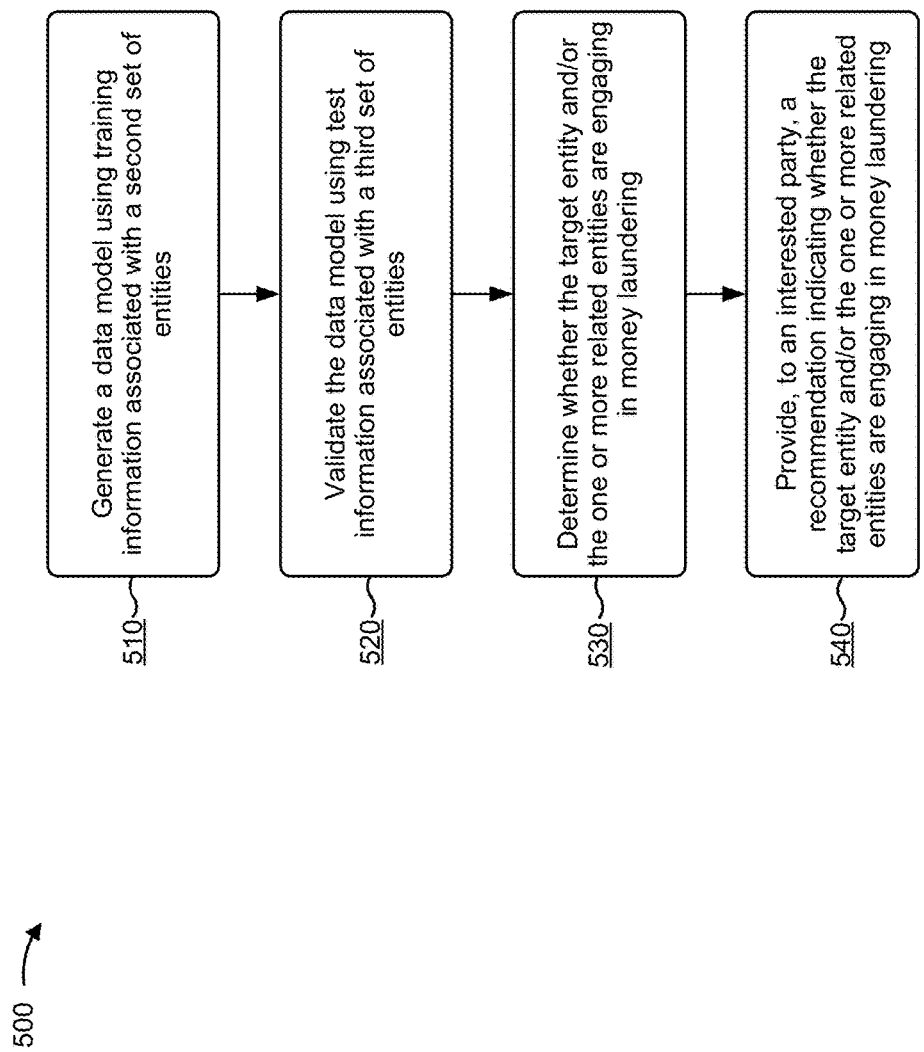

ANTI-MONEY LAUNDERING PLATFORM FOR MINING AND ANALYZING DATA TO IDENTIFY MONEY LAUNDERERS

BACKGROUND

Money laundering is a process of transforming illegally obtained profits into ostensibly legitimate assets. Anti-money laundering (AML) services provide a way to detect suspicious activities in an effort to reduce money laundering.

SUMMARY

According to some possible implementations, a method may include obtaining, by a device and from a first data source, information associated with a first set of entities involved in a money laundering investigation. The information associated with the first set of entities may include target entity information for a target entity and related entity information for a set of related entities. The method may include analyzing, by the device, the information associated with the first set of entities to identify one or more related entities of the set of related entities as money laundering candidates. The method may include obtaining, by the device and from a second data source, additional information associated with the target entity and/or the one or more related entities. The method may include determining, by the device, one or more relationships between the target entity and the one or more related entities. The one or more relationships may indicate a degree of similarity between the target entity and the one or more related entities. The method may include generating, by the device, a graph data structure that associates the target entity and the one or more related entities using the one or more relationships. The method may include generating, by the device, a data model for processing information included in the graph data structure. The score and/or the one or more scores may identify whether the target entity and/or the one or more related entities are likely to be engaging in money laundering. The method may include providing, by the device, a recommendation indicating whether the target entity and/or the one or more related entities are likely to be engaging in money laundering based on determining the score and/or the one or more scores.

According to some possible implementations, a non-transitory computer-readable medium may store one or more instructions that, when executed by the one or more processors, cause the one or more processors to obtain, from a first data source, information associated with a first set of entities involved in a money laundering investigation. The information associated with the first set of entities may include target entity information for a target entity and related entity information for a set of related entities. The one or more instructions may cause the one or more processors to obtain, from a second data source, additional information associated with the first set of entities involved in the money laundering investigation. The one or more instructions may cause the one or more processors to determine one or more relationships between the target entity and the set of related entities. The one or more relationships may indicate a degree of similarity between the target entity and the set of related entities. The one or more instructions may cause the one or more processors to generate a graph data structure that associates the target entity and the set of related entities using the one or more relationships. The one or more instructions may cause the one or more processors to analyze a set of nodes included in the graph data structure to determine a set of scores. The one or more instructions may cause the one or more processors to provide a recommendation indicating whether the target entity and/or the set of related entities are likely to be engaging in money laundering based on the set of scores.

According to some possible implementations, a platform may include one or more computing resources to obtain, from a first data source, information associated with a first set of entities involved in a money laundering investigation. The information may include target entity information for a target entity and related entity information for a set of related entities. The one or more computing resources may analyze the target entity information and the related entity information to identify one or more related entities of the set of related entities as money laundering candidates. The one or more computing resources may determine one or more relationships between the target entity and the one or more related entities. The one or more relationships may indicate a degree of similarity between the target entity and the one or more related entities. The one or more computing resources may generate a graph data structure that associates the target entity and the one or more related entities using the one or more relationships. The one or more computing resources may determine a score for the target entity and one or more scores for the one or more related entities. The one or more computing resources may provide a recommendation indicating whether the target entity and/or the one or more related entities are likely to be engaging in money laundering.

BRIEF DESCRIPTION OF THE DRAWINGS

FIG. 5 is a flow chart of an example process for analyzing the graph data structure included in the example process described with regard to FIG. 4 to determine whether one or more entities of the set of entities are engaging in money laundering.

DETAILED DESCRIPTION

The following detailed description of example implementations refers to the accompanying drawings. The same reference numbers in different drawings may identify the same or similar elements.

AML services may determine that a particular entity (e.g., a business, an employee of the business, etc.) is laundering money by detecting suspicious business transactions to which the entity is a party. However, many AML services are rule-based and manual in nature, resulting in the AML service detecting a high number of false positives (i.e., an AML service may incorrectly predict that an entity is engaging in money laundering when the entity is not engaged in money laundering). For regulations compliance, banks have to hire tens of thousands of experienced personnel to investigate these transactions manually, which is a big capital cost.

Implementations described herein provide an AML platform to analyze information associated with a money laundering investigation to determine whether one or more entities are engaging in money laundering. For example, the AML platform may obtain information associated with a money laundering investigation and may generate a graph data structure that identifies relationships between a target entity and one or more related entities that may be engaging in money laundering. Additionally, the AML, platform may generate a data model, and may use the data model to determine scores and predict classes (e.g., sentiment scores) for entities identified in the graph data structure. The scores may be used to determine whether the target entity and/or the one or more related entities are engaging in money laundering. The AML platform may generate a recommendation indicating whether the target entity and/or the one or more related entities are engaging in money laundering based on the scores.

By determining that an entity (e.g., a business or an employee of a business) is engaging in money laundering, the AML platform may help prevent crime and protect the individuals and businesses from those involved in the money laundering scheme. Additionally, the AML platform is able to efficiently and effectively detect money laundering schemes (e.g., with a lower rate of false-positives than other AML services), thereby conserving processing resources.

FIGS. 1A-1E are diagrams of an overview of an example implementation 100 described herein. As shown in FIGS. 1A-1E, example implementation 100 shows an AML platform for performing a money laundering investigation. For example, an interested party (e.g., a financial institution, such as a bank) may receive an indication of a suspicious transaction regarding a target entity, and may use the AML platform to perform a money laundering investigation to determine whether the target entity is engaging in money laundering. In some implementations, the AML platform may perform one or more actions to help the interested party determine whether the target entity is engaging in money laundering.

Figure 1A:
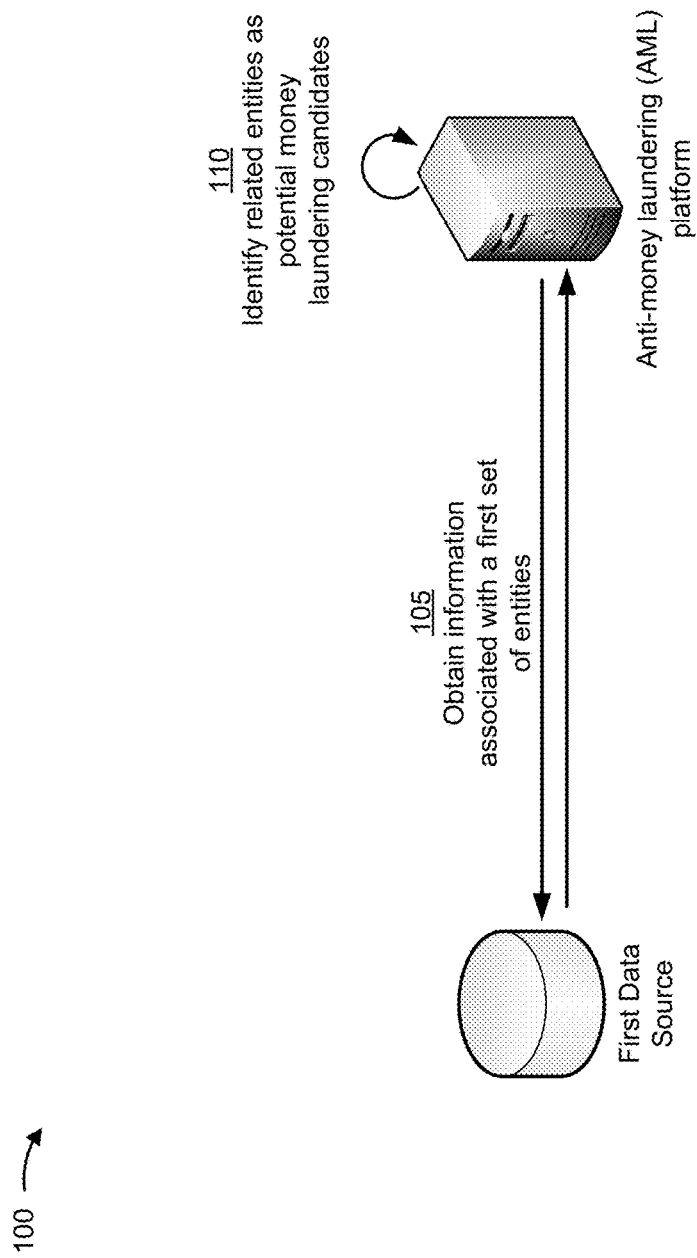
FIGS. 1A-1E are diagrams of an overview of an example implementation described herein.

As shown in FIG. 1A, and by reference number 105, the AML platform may obtain, from a first data source (e.g., a data source that provides information about the target entity), information associated with a first set of entities. The information associated with the first set of entities may include target entity information associated with the target entity and/or related entity information associated with a set of related entities. The target entity information and/or the related entity information may include information associated with a business and/or information associated with one or more employees of the business. For example, the target entity information may include information indicating a business name, an area or a field in which the business operates, a location in which the business operates, a transaction to which the business is a party, an employee name, an employee job title, an employee job description, and/or the like.

As shown by reference number 110, the AML platform may identify one or more related entities of the set of related entities as money laundering candidates. For example, the AML platform may analyze the target entity information and/or the related entity information to identify one or more related entities as money laundering candidates.

In some implementations, the AML platform may analyze the target entity information and/or the related entity information by determining a degree of similarity between one or more features of the target entity and one or more features of the one or more related entities. For example, the AML platform may analyze features such as distance (e.g., geographic distance, social distance, etc.), address information, working sector information, social media information, and/or the like. In this case, the AML platform may assign weight values to the one or more related entities based on the degree of similarity between the one or more features associated with the target entity and the one or more features associated with the one or more related entities. Additionally, the AML platform may determine whether the weight values satisfy a threshold, and the AML platform may identify a related entity as a money laundering candidate if the one or more features for the related entity satisfy the threshold.

As an example, the AML platform may analyze the target entity information and/or the related entity information by determining a distance between the target entity and each related entity of the set of related entities. In this case, the AML platform may assign weight values to related entities based on the distance between the related entities and the target entity. Additionally, the AML platform may determine whether the weight values satisfy a distance threshold. If a related entity weight value satisfies the distance threshold (e.g., is close enough to the target entity), the AML platform may identify the related entity as a money laundering candidate.

By identifying one or more related entities as money laundering candidates, the AML platform identifies a subset of the set of related entities to further analyze, thereby conserving processing resources relative to performing further analysis on the entire set of related entities.

Figure 1B:
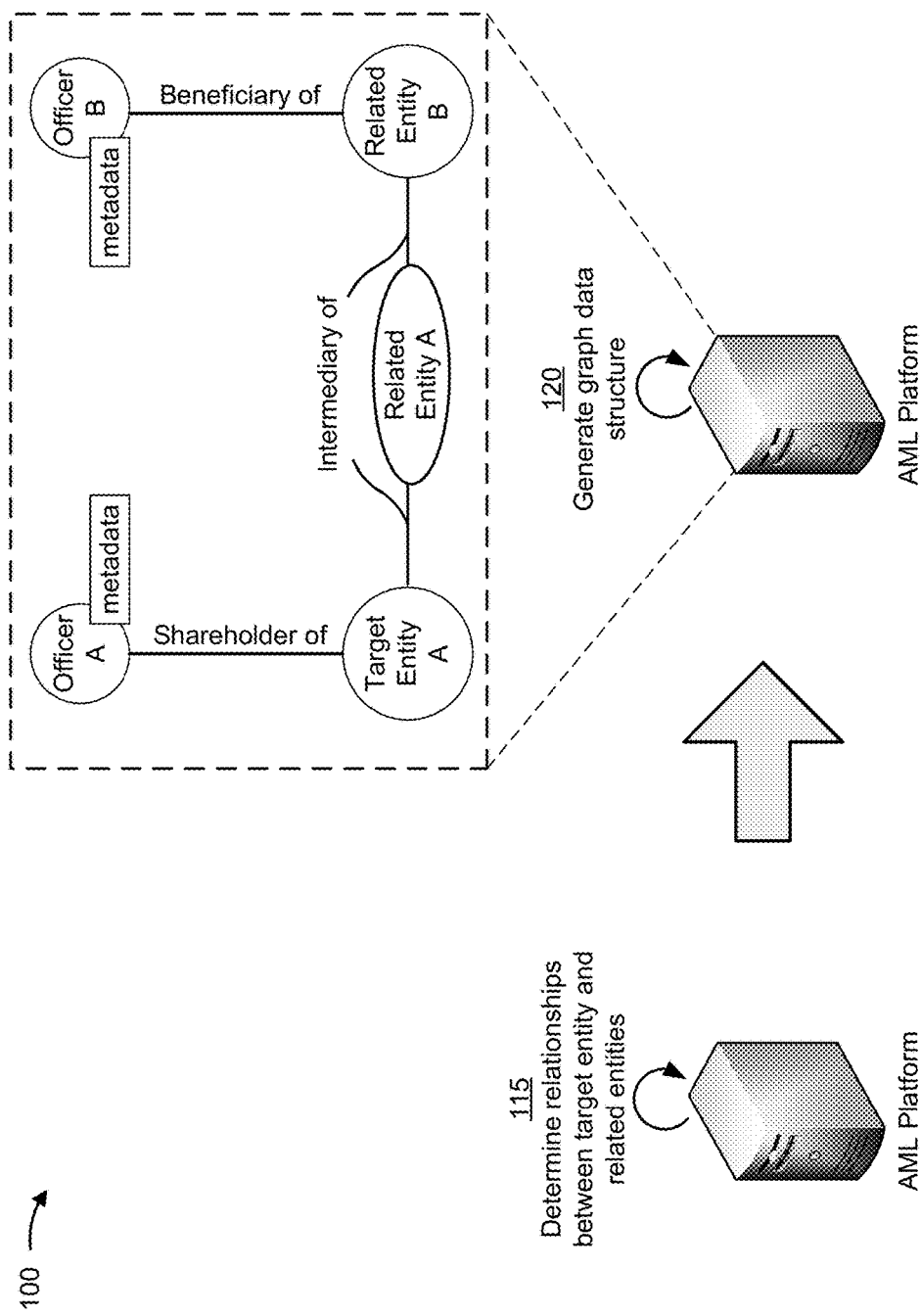

As shown in FIG. 1B, and by reference number 115, the AML platform may determine one or more relationships between the target entity and the one or more related entities. For example, the AML platform may analyze the target entity information and the related entity information obtained from the first data source to determine one or more similarity-based relationships, one or more semantic-based relationships, and/or the like.

In some implementations, the AML platform may determine one or more similarity-based relationships. For example, the AML platform may determine a degree of similarity between the target entity and the one or more related entities by analyzing the target entity information and/or the related entity information. The degree of similarity between the target entity and a related entity may, for example, be based on whether the target entity and related entity share a common field of business, whether the geographic location of the target entity is in close proximity to the related entity geographic location, whether employees of the target entity live in a geographic location that is similar to a geographic location in which employees of the related entity live, and/or the like. Additionally, the AML platform may assign weight values to the target entity information and/or the related entity information, and may use the weighted values to determine a degree of similarity between the target entity and the one or more related entities.

In some implementations, the AML platform may determine one or more semantic-based relationships. For example, the AML platform may analyze the target entity information and/or the related entity information to determine semantic phrases that may be used to establish relationships between entities. As an example, the AML platform may analyze the target entity information and the related entity information to determine that officer A is a shareholder of target entity A, that related entity A is an intermediary between target entity A and related entity B, and that officer B is a beneficiary of related entity B.

As shown by reference number 120, the AML platform may generate a graph data structure. For example, the AML platform may generate a graph data structure that associates the target entity with the one or more related entities using the one or more relationships. In this case, the graph data structure may include nodes (e.g., nodes relating to the target entity, the one or more related entities, etc.) and edges (e.g., edges representing the one or more relationships between the target entity and the one or more related entities). Additionally, the nodes may include metadata with the target entity information, the related entity information, and/or information identifying the one or more relationships between the target entity information and the related entity information. Shown as an example of FIG. 1B, the graph data structure may include a target entity A, an officer A, a related entity A, a related entity B, and an officer B. In this case, the graph data structure may associate the entities using the one or more relationships.

In this way, the AML platform may generate a data structure that associates the target entity and the one or more related entities using the one or more relationships. This may allow the AML platform to further analyze the information to determine if the target entity and/or the one or more related entities are engaging in money laundering.

Figure 1C:
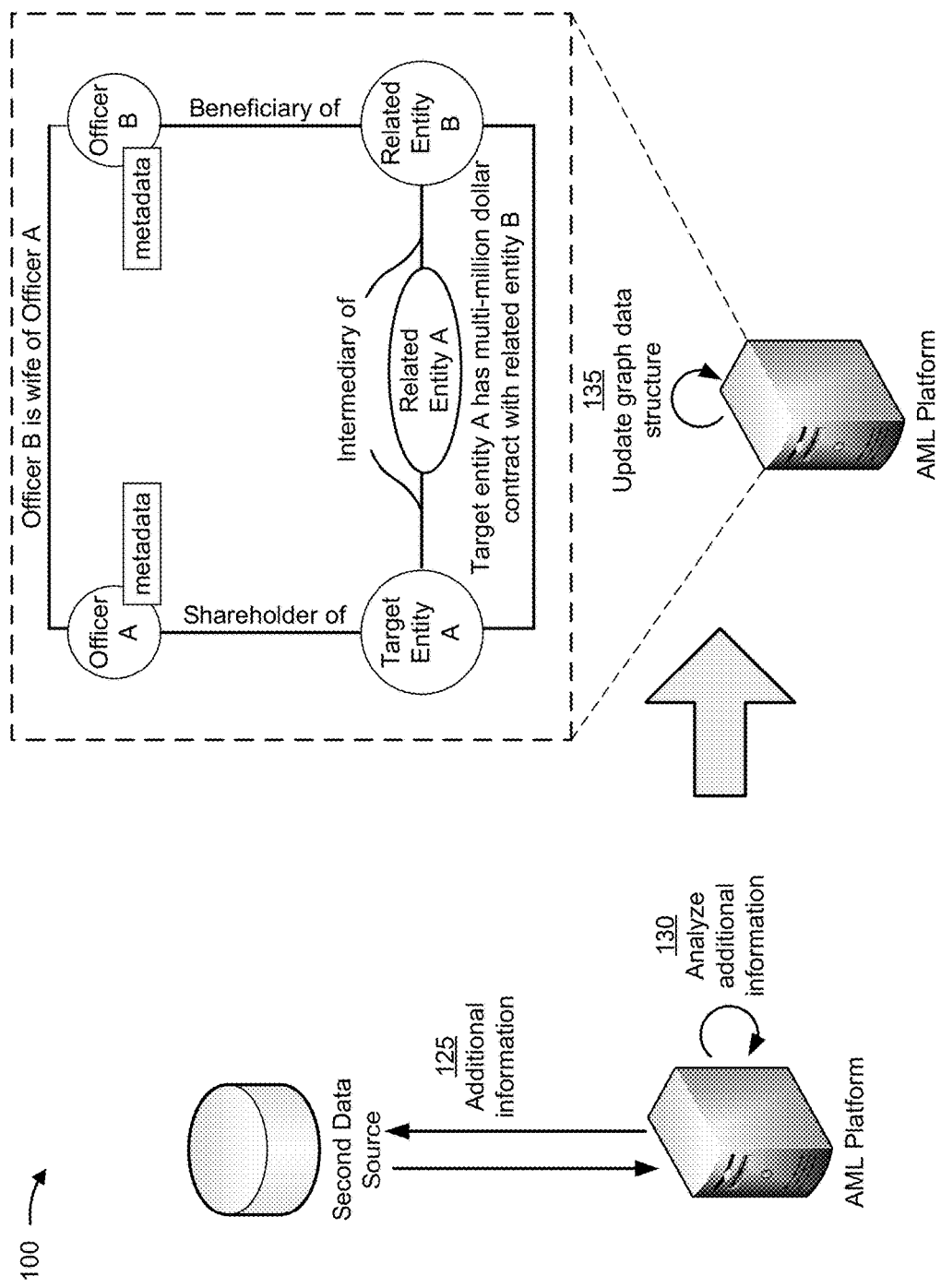

As shown in FIG. 1C, and by reference number 125, the AML platform may obtain additional information from a second data source. The additional information may include employee demographic information, information associated with a particular business transaction, and/or the like. As shown by reference number 130, the AML platform may analyze the additional information. For example, the AML platform may analyze the additional information to identify additional nodes and/or edges for the graph data structure, to verify existing nodes and edges of the graph data structure, to determine additional metadata for existing nodes of the graph data structure, to extend the existing graph with additional nodes and edges from other sources and/or the like.

As shown by reference number 135, the AML platform may update the graph data structure. For example, the AML platform may update the graph data structure by adding nodes, adding edges, removing nodes, removing edges, adding additional metadata for existing nodes, removing metadata for existing nodes, and/or the like. As shown as an example in FIG. 1C, assume the AML platform analyzes the additional information to determine that officer B is a wife of officer A, and that target entity A has a multi-million dollar contract with related entity B. In this case, the AML platform may update the data structure by adding two additional edges that identify the new relationships.

In this way, the AML platform may update the graph data structure with additional information that may be used to determine whether the target entity and/or the one or more related entities are engaging in money laundering.

Figure 1D:
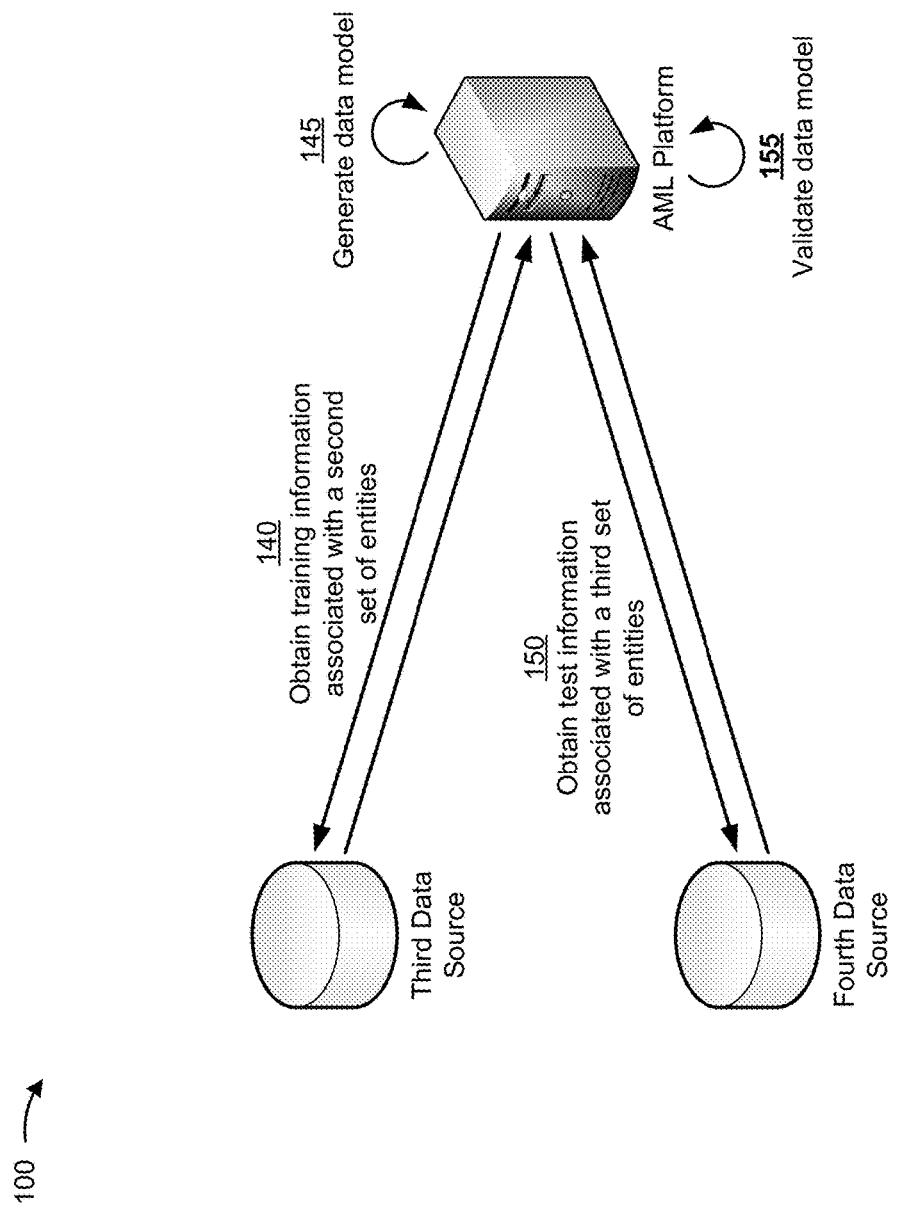

As shown in FIG. 1D, and by reference number 140, the AML platform may obtain, from a third data source, training information associated with a second set of entities. The training information may include information associated with entities, and may include information associated with businesses that are not included in the money laundering investigation. As shown by reference number 145, the AML platform may generate a data model. For example, the AML platform may generate a data model using the training information and a training dictionary. In this case, the training dictionary may include a collection of words and phrases that associates the words and phrases with particular scores. In this way, the AML platform may generate the data model by using the training dictionary to score the training information.

As shown by reference number 150, the AML platform may obtain, from a fourth data source, test information associated with a third set of entities. The test information may include current information relating to entities. As shown by reference number 155, the AML platform may validate the data model. For example, the AML platform may validate the data model by using the test information as input for the data model. In some cases, the AML platform may validate the data model by obtaining test information relating to an entity that has recently been convicted of money laundering, and may validate the data model by verifying whether the data model correctly predicts that the entity is engaging in money laundering.

In this way, the AML platform may generate and validate a data model that may be used to process information included in the graph data structure, thereby allowing the AML platform to determine whether the target entity and/or the one or more related entities are engaging in money laundering.

Figure 1E:
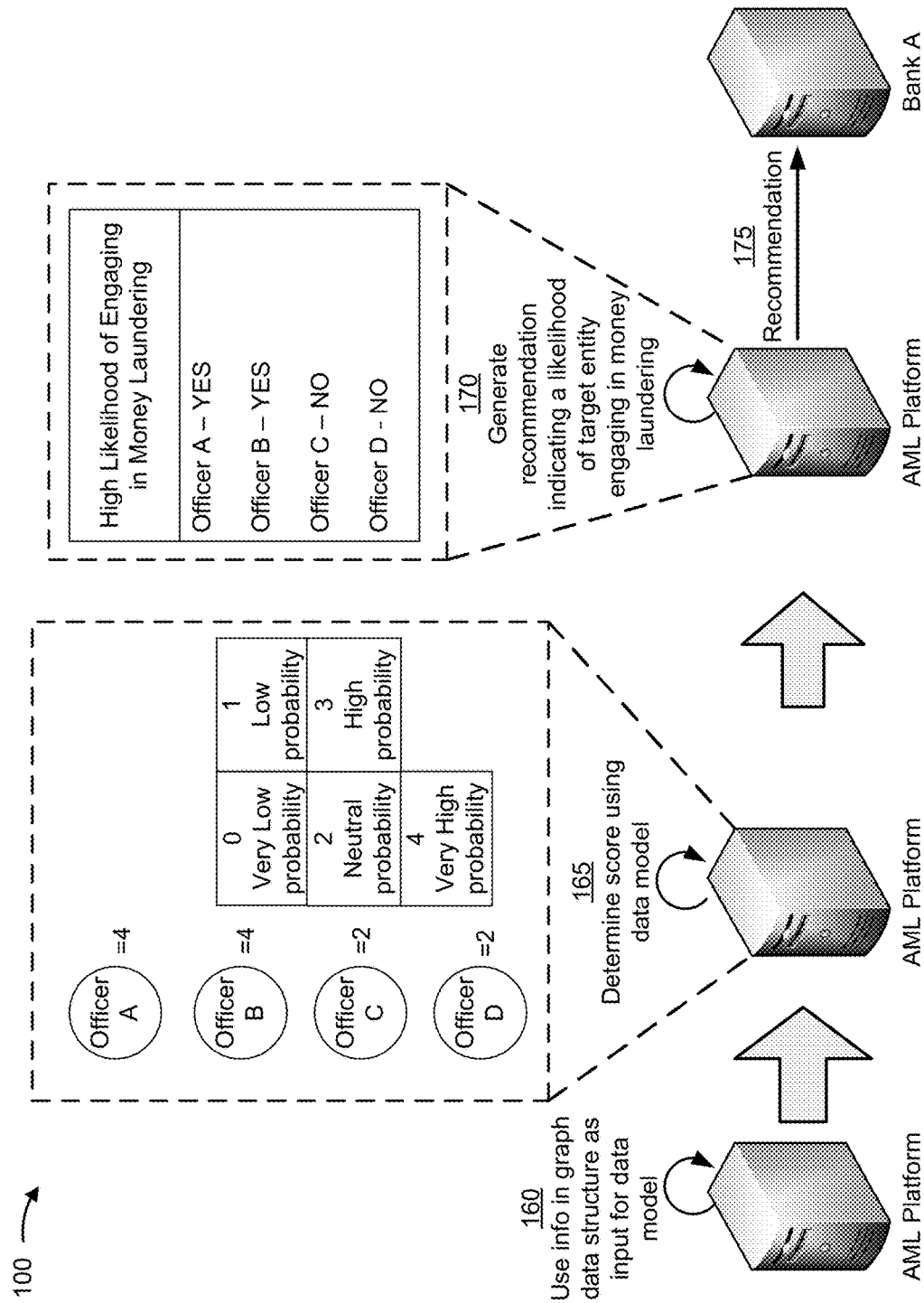

As shown in FIG. 1E, and by reference number 160, the AML platform may use information included in the graph data structure as input for the data model. For example, the AML platform may use the one or more nodes, the one or more edges, and/or the metadata associated with the one or more nodes as input for the data model. As shown by reference number 165, the AML platform may determine scores (e.g., sentiment scores) using the data model. In this case, a higher score may indicate a higher likelihood of an entity engaging in money laundering (and vice versa). Shown as an example, the scores may range from 0 to 4, where 0 indicates a very low probability, 1 indicates a low probability, 2 indicates a neutral probability, 3 indicates a high probability, and 4 indicates a very high probability. In this example, the data model may receive information associated with officer A as input, may analyze the information, and may output a score of 4, indicating a very high probability that officer A is engaging in money laundering.

As shown by reference number 170, the AML platform may generate a recommendation indicating whether the target entity is engaging in money laundering. For example, if a score is positive or very positive, the AML platform may generate a recommendation indicating that the entity is engaging in money laundering, and if a score is negative or very negative, the AML platform may generate a recommendation indicating that the entity is not engaging in money laundering. In some cases, rather than make a definitive determination, the recommendation may include a confidence score indicating a likelihood of the entity engaging in money laundering. As shown by reference number 175, the AML platform may provide the recommendation to an interested party (e.g., a financial institution, such as a bank).

In this way, the AML, platform efficiently and objectively detects money laundering, thereby reducing a rate of false positive predictions.

As indicated above, FIGS. 1A-1E are provided merely as an example. Other examples are possible and may differ from what was described with regard to FIGS. 1A-1E. For example, the AML platform may determine whether an individual is engaging in money laundering, such as a member of a criminal syndicate, a gang member, and/or the like. In some implementations, the AML platform may determine whether an entity or an individual is engaging in an illegal act that is related to money laundering, such as fraud, insider trading, market manipulation, and/or the like.

Figure 2A:
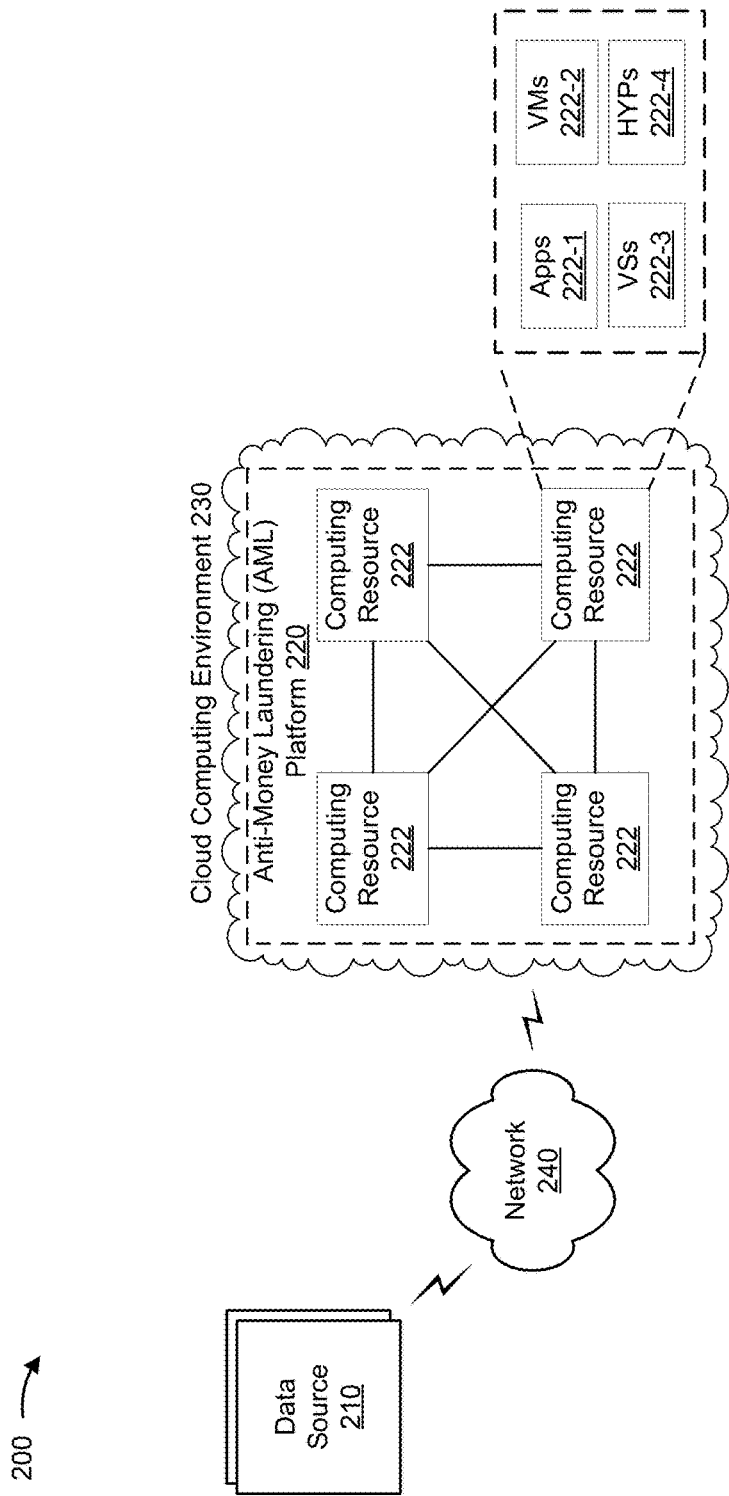
FIGS. 2A and 2B are diagrams of an example environment in which systems and/or methods, described herein, may be implemented.
Figure 2B:
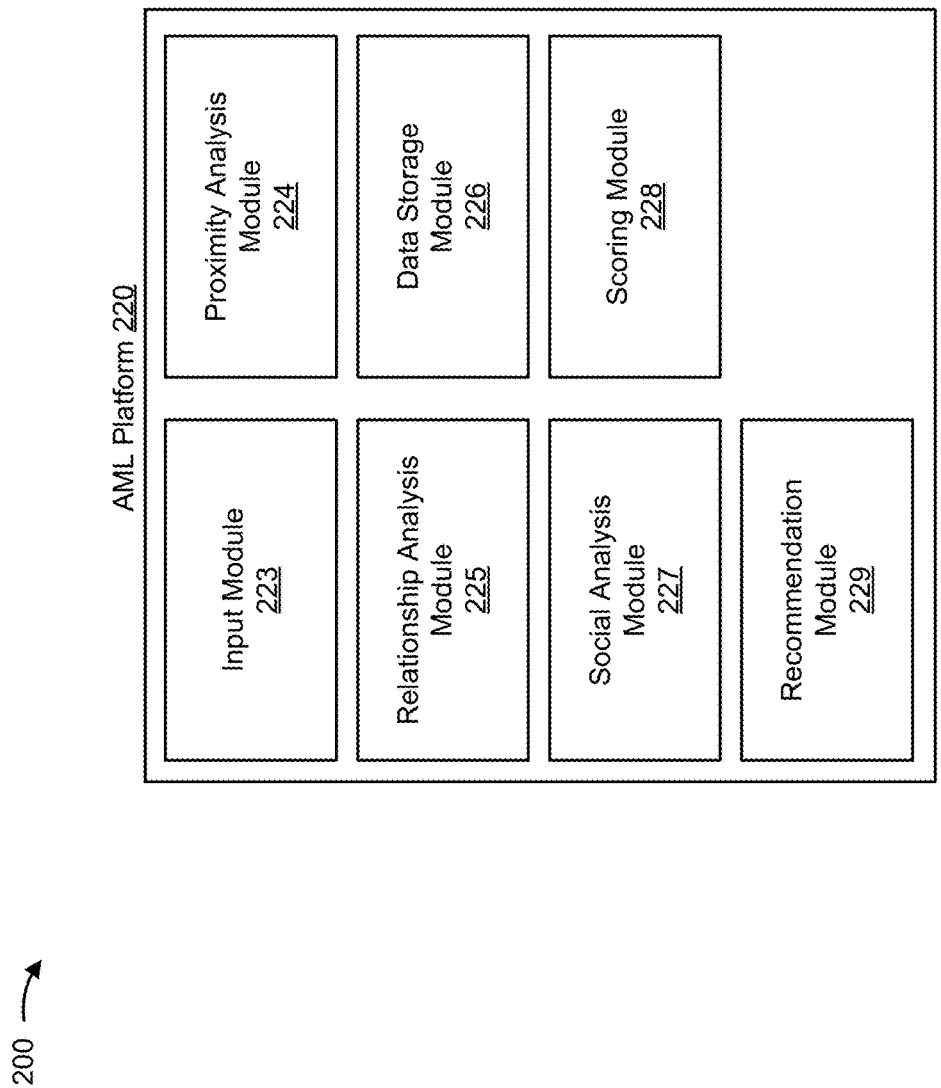

FIGS. 2A and 2B are diagrams of an example environment 200 in which systems and/or methods, described herein, may be implemented. As shown in FIG. 2A, environment 200 may include data source 210, AML platform 220 hosted within cloud computing environment 230, and/or network 240. Devices of environment 200 may interconnect via wired connections, wireless connections, or a combination of wired and wireless connections.

Data source 210 includes one or more devices capable of storing and providing information associated with an entity. For example, data source 210 may include a server or a group of servers. In some implementations, data source 210 may include a news data source (e.g., a news source that provides information relating to a target entity), a social media data source (e.g., Facebook, Twitter, etc.), a website data source (e.g., a financial website, a company website, a website that publishes secret information, news leaks, and/or classified media from anonymous sources, etc.), an internal data source (e.g., a data source internal to an entity performing the money laundering investigation), and/or the like. In some implementations, data source 210 may provide, to AML platform 220, target entity information and/or related entity information. In some implementations, a first data source 210 (e.g., a news source) may provide information associated with a first set of entities. Additionally, a second data source 210 (e.g., a social media source) may provide additional information associated with the first set of entities. Additionally, a third data source 210 (e.g., another news source, another social media source, or a website) may provide information associated with a second set of entities (e.g., entities that may or may not be subject to the money laundering investigation). Additionally, a fourth data source 210 (e.g., another news source, another social media source, or a website) may provide information (e.g. training information, test information, etc.) that may be used to train and/or validate a data model.

AML platform 220 includes one or more devices capable of obtaining, storing, generating, analyzing, and/or providing information associated with a money laundering investigation. For example, AML platform 220 may include a cloud server or a group of cloud servers. In some implementations, AML platform 220 may obtain information associated with a money laundering investigation. In some implementations, AML platform 220 may analyze the information and may provide a recommendation to a party interested in the money laundering investigation (e.g., a financial institution, such as a bank, a law enforcement agency, etc.).

In some implementations, as shown, AML platform 220 may be hosted in cloud computing environment 230. Notably, while implementations described herein describe AML platform 220 as being hosted in cloud computing environment 230, in some implementations, AML platform 220 may not be cloud-based (i.e., may be implemented outside of a cloud computing environment) or may be partially cloud-based.

Cloud computing environment 230 includes an environment that hosts AML, platform 220. Cloud computing environment 230 may provide computation, software, data access, storage, and/or other services that do not require end-user knowledge of a physical location and configuration of system(s) and/or device(s) that host AML platform 220. As shown, cloud computing environment 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host AML platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2A, computing resource 222 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by a device associated with an interested party. Application 222-1 may eliminate a need to install and execute the software applications on a device associated with an interested party. For example, application 222-1 may include software associated with AML platform 220 and/or any other software capable of being provided via cloud computing environment 230. In some implementations, one application 222-1 may transmit/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user, and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 240 one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

FIG. 2B is a diagram of example functional modules of AML platform 220. As shown in FIG. 2B, AML platform 220 may include an input module 223, a proximity analysis module 224, a relationship analysis module 225, a data storage module 226, a social analysis module 227, a scoring module 228, a recommendation module 229, and/or the like. In some implementations, one or more modules may be implemented as part of AML platform 220. The functional modules of AML platform 220 may be implemented in hardware, software executing on hardware, and/or firmware.

Input module 223 operates on one or more computing resources and is associated with obtaining, formatting, storing, and/or providing information associated with a money laundering investigation. For example, input module 223 may obtain, from a first data source 210, target entity information and/or related entity information for a first set of entities. Additionally, input module 223 may obtain, from a second data source 210, additional target entity information and/or additional related entity information for the first set of entities. Additionally, input module 223 may obtain, from a third data source 210, training information used to generate a data model. Additionally, input module 223 may obtain, from a fourth data source 210, test information used to validate the data model. In some implementations, input module 223 may obtain thousands, millions, billions, trillions, etc. of data items from one or more data sources 210. In some implementations, input module 223 may format information obtained from multiple data sources into a single data type, thereby allowing one or more other modules of AML platform 220 to further analyze the information.

Proximity analysis module 224 operates on one or more computing resources and is associated with identifying one or more related entities as money laundering candidates. For example, proximity analysis module 224 may analyze target entity information associated with a target entity and related entity information associated with a set of related entities to identify one or more related entities as money laundering candidates. In some implementations, proximity analysis module 224 may, for a related entity of the set of related entities, determine a distance between the related entity and the target entity.

Relationship analysis module 225 operates on one or more computing resources and is associated with determining one or more relationships between a target entity and one or more related entities. For example, relationship analysis module 225 may include a similarity analysis submodule and/or a semantic analysis submodule. In some implementations, the similarity analysis submodule may analyze the target entity information and/or the related entity information to determine a degree of similarity between the target entity and the related entity. In some cases, the similarity analysis submodule may assign, to a related entity, a weight value indicating the degree of similarity between the related entity and the target entity. Additionally, or alternatively, the semantic analysis submodule may analyze the target entity information and/or the related entity information to determine semantic relationships between the target entity and the one or more related entities.

Data storage module 226 operates on one or more computing resources and is associated with generating a data structure (e.g., a graph data structure) that associates the target entity and the one or more related entities using the one or more relationships. For example, data storage module 226 may generate a graph data structure that includes nodes (e.g., representing the target entity, the one or more related entities, etc.) and edges (e.g., representing the one or more relationships between the target entity and the one or more related entities). In some implementations, data storage module 226 may update the graph data structure to include additional information associated with the money laundering investigation.

Social analysis module 227 operates on one or more computing resources and is associated with identifying and/or generating additional relationships between the target entity and the one or more related entities. For example, social analysis module 227 may analyze, from data source 210 (e.g., a news source, a social media source, a website, etc.), additional information to identify information relevant to the money laundering investigation. In some implementations, an output generated by social analysis module 227 may be used by data storage module 226 to update the graph data structure.

Scoring module 228 operates on one or more computing resources and is associated with determining a score for a target entity and one or more scores for the one or more related entities. For example, scoring module 228 may include a data model generation submodule, a data model validation submodule, a data model processing submodule, and/or the like. In some implementations, the data model generation submodule may generate a data model using training information. In some implementations, the data model validation submodule may validate the data model using test information. In some implementations, the data model processing submodule may use the data model to determine a score (e.g., a sentiment score) for the target entity and/or one or more scores (e.g., sentiment scores) for the one or more related entities.

Recommendation module 229 operates on one or more computing resources and is associated with providing a recommendation. For example, recommendation module 229 may generate a recommendation indicating whether the target entity and/or the one or more related entities are engaging in money laundering, and may provide the recommendation to an interested party (e.g., a financial institution). As another example, recommendation module 229 may generate a recommendation that includes one or more actions that an interested party (e.g., an investigator) may take to determine whether the entity is engaging in money laundering.

The number and arrangement of devices and modules shown in FIG. 2B are provided as an example. In practice, there may be additional devices and/or modules, fewer devices and/or modules, different devices and/or modules, or differently arranged devices and/or modules than those shown in FIG. 2B. Furthermore, two or more devices and/or modules shown in FIG. 2B may be implemented within a single device, or a single device and/or a single module shown in FIG. 2B may be implemented as multiple, distributed devices and/or modules. For example, although modules 223-229 are shown as being operated by a single cloud platform 220 (e.g., AML platform 220), modules 223-227 may be operated by a first cloud platform 220 (e.g., a link analysis platform) and modules 228-229 may be operated by a second cloud platform 220 (e.g., a scoring and recommendation platform) that may communicate via an interface, such as an application programming interface (API), a secure interface, or the like. Additionally, or alternatively, a set of devices (e.g., one or more devices) of environment 200 may perform one or more functions described as being performed by another set of devices of environment 200.

Figure 3:
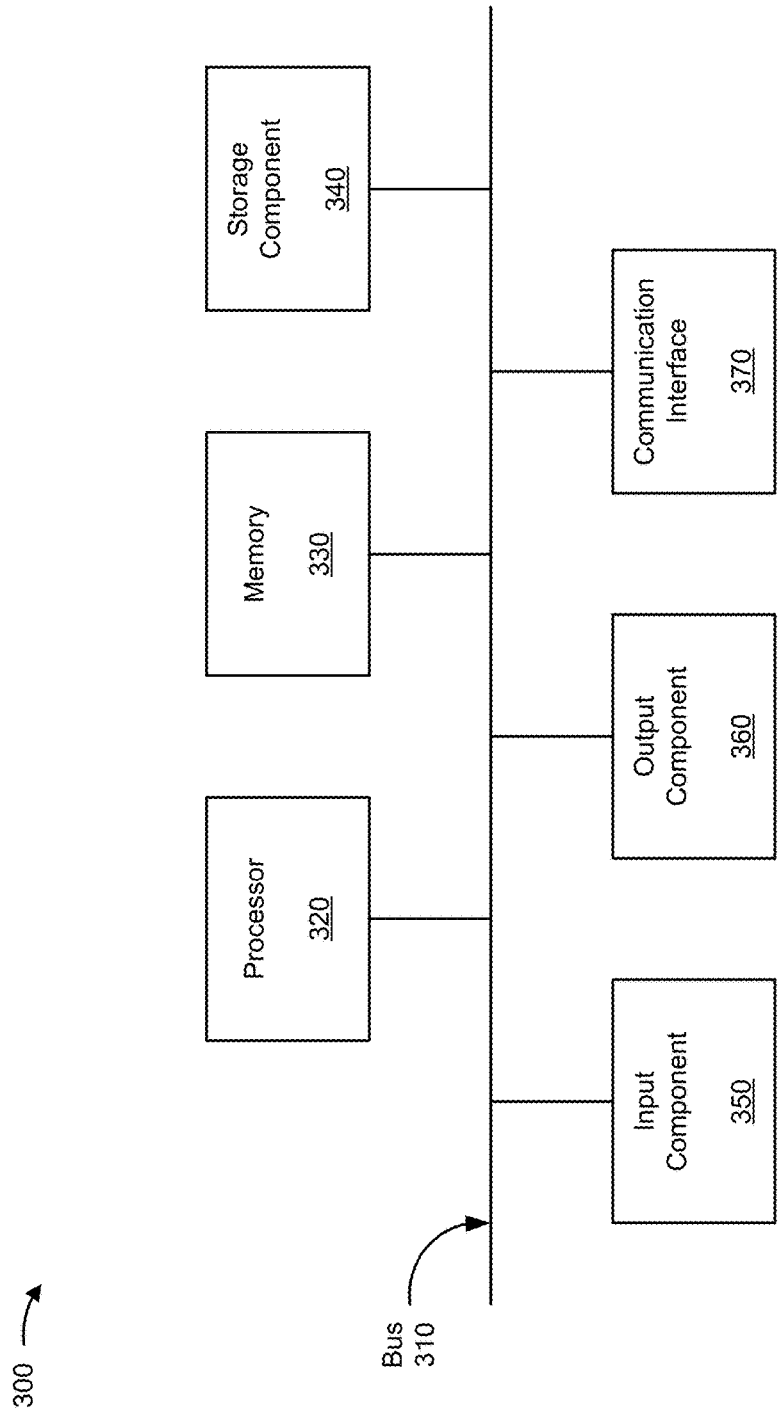
FIG. 3 is a diagram of example components of one or more devices of FIG. 2.

FIG. 3 is a diagram of example components of a device 300. Device 300 may correspond to data source 210 and/or AML platform 220. In some implementations, data source 210 and/or AML platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
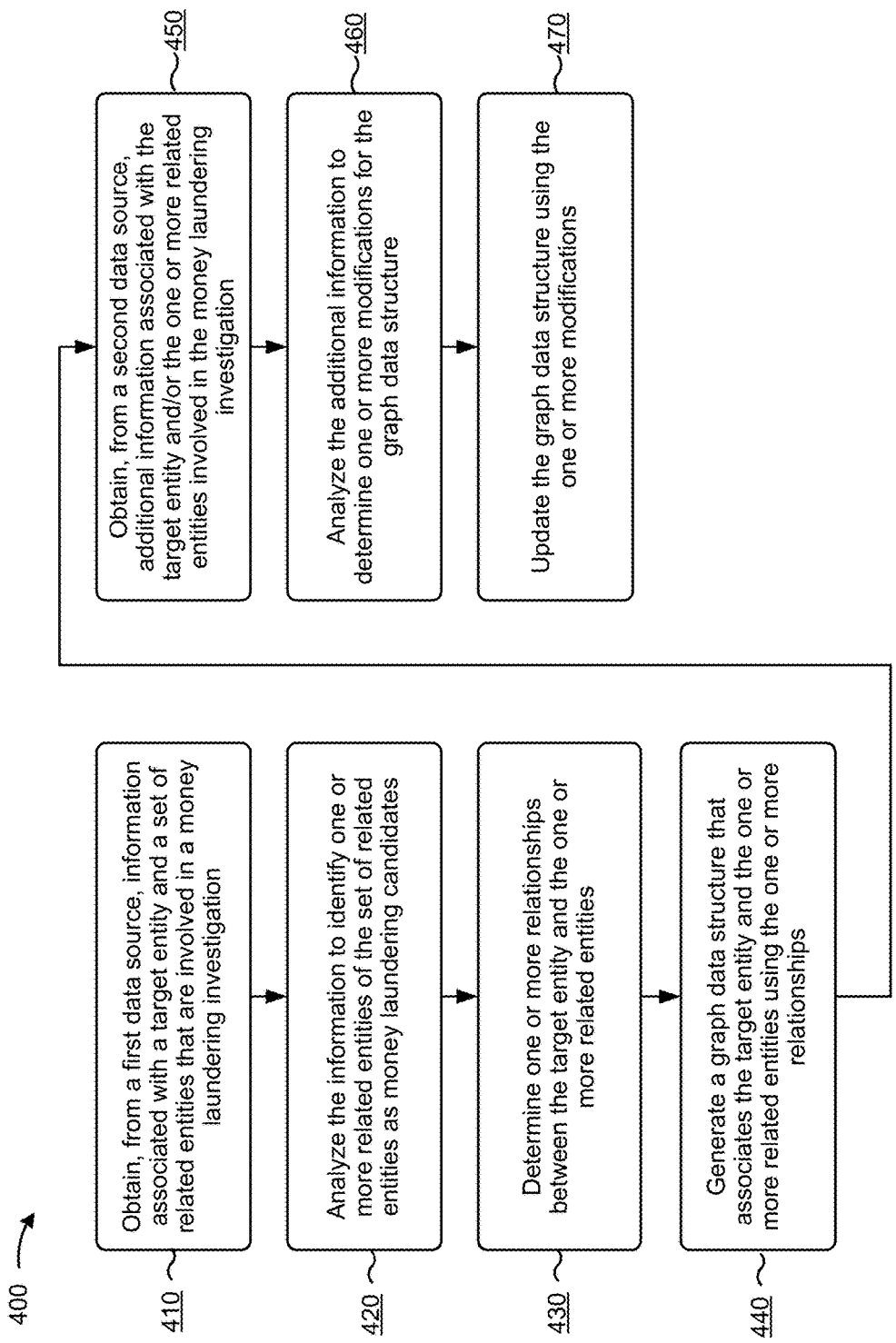
FIG. 4 is a flow chart of an example process for identifying a set of entities as money laundering candidates, determining one or more relationships between the money laundering candidates, and generating a graph data structure to store the one or more relationships between the money laundering candidates.

FIG. 4 is a flow chart of an example process 400 for identifying a set of entities as money laundering candidates, determining one or more relationships between the money laundering candidates, and generating a graph data structure to store the one or more relationships between the money laundering candidates. In some implementations, one or more process blocks of FIG. 4 may be performed by AML platform 220. In some implementations, one or more process blocks of FIG. 4 may be performed by another device or a group of devices separate from or including AML platform 220, such as data source 210.

As shown in FIG. 4, process 400 may include obtaining, from a first data source, information associated with a target entity and a set of related entities that are involved in a money laundering investigation (block 410). For example, AML platform 220 may obtain, from a first data source 210 (e.g., which may represent tens, hundreds, or even thousands of data sources), target entity information for a target entity that is involved in a money laundering investigation and/or related entity information for a set of related entities that may be involved in the money laundering. The target entity information may include information associated with a business and/or information associated with one or more employees of the business. For example, the target entity information may include information indicating a business name, an area or a field in which the business operates, a location in which the business operates, a transaction to which the business is a party, an employee name, an employee job title, an employee job description, and/or the like. The related entity information may also include information associated with a business and/or information associated with one or more employees of the business. A related entity may be an entity that is engaging in a transaction with the target entity and/or that is an intermediary in a transaction involving the target entity.

In some implementations, AML platform 220 may obtain information associated with a first set of entities involved in a money laundering investigation. For example, AML platform 220 may obtain target entity information and/or related entity information from a first data source 210 that provides leaks (i.e., potentially incriminating information) about the target entity. In some cases, AML platform 220 may provide a target entity indicator (e.g., a business name, an employee name, etc.) as input to search the first data source 210, causing the first data source 210 to provide the information associated with the money laundering investigation.

In some implementations, AML platform 220 may store the information associated with the money laundering investigation. For example, AML platform 220 may store the information associated with the money laundering investigation using a graph data structure, or in a format that may allow AML platform 220 to further analyze the information, as described further herein.

As further shown in FIG. 4, process 400 may include analyzing the information to identify one or more related entities of the set of related entities as money laundering candidates (block 420). For example, AML platform 220 may analyze the target entity information and/or the related entity information to identify one or more related entities as money laundering candidates. In some implementations, a money laundering candidate may be a related entity that is within a threshold distance of the target entity (e.g., a threshold social distance, a threshold geographic distance, etc.).

In some implementations, AML platform 220 may analyze the target entity information and/or the related entity information to determine whether the information satisfies a threshold social distance. For example, AML platform 220 may compare, for each related entity of the set of related entities, a social distance between a related entity and the target entity. A social distance may indicate a degree to which two entities (e.g., two individuals) are connected. As an example, a husband and a wife may have a closer social distance than two unrelated individuals. If a social distance between a related entity and the target entity satisfies the threshold social distance, then AML platform 220 may identify the related entity as a money laundering candidate.

In some implementations, AML platform 220 may analyze the target entity information and/or the related entity information to determine whether the information satisfies a threshold geographic distance. For example, AML platform 220 may determine, for each related entity of the set of related entities, a geographic distance between the related entity and the target entity. If a geographic distance between a related entity and the target entity satisfies the threshold geographic distance, then AML platform 220 may identify the related entity as a money laundering candidate.

In some implementations, AML platform 220 may apply weights to distance intervals, may determine a distance (e.g., a social distance, a geographic distance, etc.) between the target entity and a related entity, and may assign the related entity a particular weight based on the distance interval with which the distance is associated. As an example, AML platform 220 may determine a degree of similarity in distance using a vertex distance algorithm based on the following formula:

$$D(E,E',\text{relation\_type}) = \Phi(E,E') + \Sigma[f(\text{relation\_type})] \quad (1)$$

In equation 1, the function D (E, E', relation_type) may represent a degree of similarity in distance between a target entity and a related entity. The term relation_type may represent a weight assigned to the relationship between the target entity and the related entity. The function $\Phi(E, E')$ indicates a degree of similarity in distance between the target entity and the related entity. In some implementations, AML, platform 220 may apply the vertex distance algorithm to identify one or more related entities as money laundering candidates.

By identifying one or more related entities as money laundering candidates, AML platform 220 may perform further analysis on a subset of the information obtained from the first data source 210, thereby conserving processing resources relative to performing further analysis on all of the information.

As further shown in FIG. 4, process 400 may include determining one or more relationships between the target entity and the one or more related entities (block 430). For example, AML platform 220 may determine one or more relationships between the target entity and the one or more related entities by analyzing the target entity information and/or related entity information associated with the one or more related entities. In some implementations, AML platform 220 may analyze the target entity information and/or the related entity information to determine one or more similarity-based relationships, one or more semantic-based relationships, and/or the like.

In some implementations, AML platform 220 may determine one or more similarity-based relationships. For example, AML platform 220 may analyze information included in the target entity information and/or information included in the related entity information to determine a degree of similarity between the target entity and a related entity. The degree of similarity between the target entity and a related entity may, for example, be based on whether the target entity and related entity share a common field of business, whether the geographic location of the target entity is in close proximity to the related entity geographic location, whether employees of the target entity live in a geographic location that is similar to a geographic location in which employees of the related entity live, whether employees of the target entity and employees of the related entity are within a threshold social distance, and/or the like. Additionally, AML platform 220 may assign weight values to the target entity information and/or the related entity information, and may use the weighted values to determine a degree of similarity between the target entity and the one or more related entities.

As an example, AML platform 220 may determine the degree of similarity between the target entity and the related entity based on the following similarity analysis formula:

$$\Phi(X,X') = \Sigma(\delta(x_i, x'_i)) \quad (2)$$

In equation 2, the function $\Phi(X, X')$ may represent an overall degree of similarity between the target entity and the related entity. The Kronecker Delta operator ($\delta$) may represent a degree of similarity between a property of the target entity and a property of the related entity (e.g., a property may be a particular type of information, such as a field in which a business operates, a geographic location of the business, etc.). The Kronecker Delta operator may have a value of 1 if the property value for the target entity and the property value for the related entity are the same. In some implementations, AML platform 220 may apply the similarity analysis formula to determine one or more relationships between the target entity and the one or more related entities.

In some implementations, AML platform 220 may determine one or more semantic-based relationships. For example, AML platform 220 may analyze the target entity information and/or the related entity information to determine semantic phrases between entities. A semantic phrase may, for example, indicate a relationship between words and/or phrases included in the target entity information and/or the related entity information. As an example, the target entity information and the related entity information may indicate that officer A is an employee of entity A, that officer A is a director, that officer A engaged in a business dealing with officer B, and that officer B is a director of entity B. In this case, AML, platform 220 may analyze the target entity information and the related entity information to identify the following semantic phrase: officer A is a director of entity A and is engaged in a business dealing with officer B who is a director of entity B.

By determining one or more relationships between the target entity and the one or more related entities, AML platform 220 may generate a graph data structure that may be used for further analysis.

As further shown in FIG. 4, process 400 may include generating a graph data structure that associates the target entity and the one or more related entities using the one or more relationships (block 440). For example, AML platform 220 may generate a graph data structure that includes nodes (e.g., representing the target entity, the one or more related entities, etc.) and edges (e.g., representing the one or more relationships between the target entity and the one or more related entities). In some implementations, a graph data structure may refer to a data structure that represents data in a graph format (e.g., a knowledge graph, a graph database, a knowledge base, or the like). Additionally, the one or more nodes may include metadata that includes the target entity information, the related entity information, information identifying the one or more relationships between the nodes, and/or the like.

In some implementations, the graph data structure may include a set of nodes and a set of edges that are associated with the set of nodes. For example, the set of nodes may correspond to entities (e.g., the target entity, the one or more related entities, etc.), and the set of edges may correspond to relationships between the nodes. As an example, a first node (e.g., "officer A") and a second node (e.g., "entity A") may include an edge (e.g., "is a shareholder of") that identifies a relationship between the first node and the second node (e.g., that officer A is a shareholder of entity A).

In some implementations, the graph data structure may store large quantities of data. For example, the graph data structure may include thousands, tens of thousands, hundreds of thousands, or even millions of nodes and edges. In this way, AML, platform 220 is able to store large quantities of data for processing. Additionally, the large quantities of data may be such that a human operator or an inferior AML system may be objectively unable to analyze or process.

By generating a graph data structure that associates the target entity and the one or more related entities using the one or more relationships, AML platform 220 stores information in a manner that allows for a subsequent analysis to determine whether the target entity and/or the one or more related entities are engaging in money laundering.

As further shown in FIG. 4, process 400 may include obtaining, from a second data source, additional information associated with the target entity and/or the one or more related entities involved in the money laundering investigation (block 450). For example, AML platform 220 may obtain, from a second data source 210 (e.g., which may represent tens, hundreds, or even thousands of data sources), additional target entity information and/or additional related entity information. The additional target entity information and the additional related entity information may include information associated with a business and/or information associated with one or more employees of the business, such as employee demographic information (e.g., an employee address, an employee gender, an employee marital status, etc.), information indicating details of a business transaction (e.g., a social media post describing details of a business transaction, a news source leak revealing details of a business transaction, etc.), and/or the like.

In some implementations, AML platform 220 may obtain additional information associated with the money laundering investigation from a second data source 210. For example, AML platform 220 may obtain additional information associated with the target entity from a second data source 210, such as a news source, a social media source, a website, and/or the like. In this case, AML platform 220 may use a data mining technique to obtain the additional information. In some implementations, AML platform 220 may obtain large quantities of additional information (e.g., gigabytes, terabytes, petabytes, etc.) from multiple second data sources 210 (e.g., thousands of second data sources 210), thereby allowing AML platform 220 to make more accurate predictions than AML services that are unable to process large amounts of data.

In this way, AML platform 220 may obtain additional information that may be analyzed to allow AML platform 220 to determine whether the target entity and/or the one or more related entities are engaging in money laundering.

As further shown in FIG. 4, process 400 may include analyzing the additional information to determine one or more modifications for the graph data structure (block 460). For example, AML platform 220 may analyze additional target entity information and/or additional related entity information to identify additional nodes and/or edges for the graph data structure, to verify existing nodes and edges of the graph data structure, to determine additional metadata for particular nodes of the graph data structure, to remove nodes and/or edges from the graph data structure, and/or the like.

In some implementations, AML platform 220 may analyze the additional information to identify additional nodes and/or edges for the graph data structure. For example, AML platform 220 may analyze the additional information to identify one or more additional related entities and one or more additional relationships between the target entity and the one or more related entities. In this case, AML, platform 220 may analyze the information by performing a similarity analysis and/or a semantic analysis, as described above. As an example, AML platform 220 may determine that an entity not previously included in the one or more related entities satisfies a threshold level of similarity with the target entity and, thus, should be included in the graph data structure. As another example, AML platform 220 may determine that a relationship not previously identified between the target entity and a related entity satisfies a threshold level of similarity and, thus, should be included in the graph data structure.

Additionally, or alternatively, AML platform 220 may verify existing nodes and edges of the graph data structure. For example, AML platform 220 may verify the nodes and edges of the graph data structure by comparing the nodes and edges of the graph data structure and the additional information. In some cases, AML platform 220 may determine whether the additional information satisfies a threshold level of similarity with the nodes and edges.

If AML platform 220 determines that the additional information is consistent with the nodes and edges, the verification may succeed. If AML platform 220 determines that the additional information is not consistent with the nodes and edges, and the additional information is obtained from a credible source (e.g., a Facebook profile of an employee, a reputable news source, etc.), AML platform 220 may remove the nodes and edges from the graph data structure. If AML platform 220 determines that the additional information is not consistent with the nodes and edges, and the additional information is not from a credible source (e.g., a user Tweeting an accusation about an employee), AML platform 220 may perform a credibility analysis to determine whether to verify the nodes and edges or to remove the nodes and edges from the graph data structure.

Additionally, or alternatively, AML, platform 220 may analyze the additional information to determine additional metadata for nodes. For example, AML platform 220 may analyze the additional information to generate profiles for entities. In this case, AML platform 220 may generate profiles that may be added to the graph data structure as metadata associated with the nodes. Additionally, or alternatively, AML platform 220 may analyze the additional information and determine to remove metadata from nodes, by performing an analysis described above.

Additionally, or alternatively, AML platform 220 may remove nodes and/or edges from the graph data structure. For example, AML platform 220 may determine a set of relevancy scores for a set of nodes and/or edges included in the graph data structure. A relevancy score may indicate a degree of relevancy of information in relation to money laundering investigations. In this case, AML platform 220 may determine whether one or more relevancy scores of the set of relevancy scores satisfy a relevancy threshold. A relevancy threshold may be a limit or a boundary (e.g., an upper boundary, a lower boundary) that identifies whether a node or an edge is satisfying a particular relevancy standard. If one or more relevancy scores satisfy the relevancy threshold, then AML platform 220 may remove one or more nodes and/or one or more edges that are associated with the one or more relevancy scores from the graph data structure. In this way, AML platform 220 ensures that only relevant data is stored, thereby conserving processing resource that might otherwise be used to process irrelevant data.

In this way, AML platform 220 may update the graph data structure to include the additional information, thereby providing additional entities and/or relationships that may be analyzed to determine whether the target entity and/or the one or more related entities are engaging in money laundering.

As further shown in FIG. 4, process 400 may include updating the graph data structure using the one or more modifications (block 470). For example, AML platform 220 may update the graph data structure by adding or removing nodes, adding or removes edges, adding or removing node metadata, and/or the like.

In some implementations, AML platform 220 may automatically update the graph data structure by predicting information. For example, AML platform 220 may apply a machine learning technique and/or an artificial intelligence technique to predict information that is to be included in the graph data structure. In this case, AML platform 220 may analyze the nodes and edges of the graph data structure to identify a trend. A trend may be a reoccurring person, place, thing, relationship, and/or the like. In some cases, AML platform 220 may compare information associated with the trend to a trend threshold to determine whether the information is to be added to the graph data structure.

As an example, assume AML platform 220 receives information for the graph data structure indicating that nine shareholders of entity A are engaging in a shareholder vote. Further assume that entity A has ten total shareholders and that shareholder bylaws require all shareholders to be present for the shareholder vote. In this case, AML platform 220 may apply a machine learning technique to identify a trend (e.g., that all shareholders are likely to be present at the shareholders meeting). By identifying the trend, AML platform 220 is able to update the graph data structure so that edges indicate that all ten shareholders are participating in the shareholder vote. In this way, AML platform 220 conserves processing resources that might otherwise be used to correct errors in the graph data structure. Furthermore, AML platform 220 reduces a rate of false positives by using machine learning and/or artificial intelligence to make more accurate money laundering determinations.

By using the one or more modifications to update the graph data structure, AML platform 220 may further analyze the updated graph data structure to determine whether the target entity and/or the one or more related entities are engaging in money laundering.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for analyzing the graph data structure included in the example process described with regard to FIG. 4 to determine whether one or more entities of the set of entities are engaging in money laundering. In some implementations, one or more process blocks of FIG. 5 may be performed by AML platform 220. In some implementations, one or more process blocks of FIG. 5 may be performed by another device or a group of devices separate from or including AML platform 220, such as data source 210.

As shown in FIG. 5, process 500 may include generating a data model using training information associated with a second set of entities (block 510). For example, AML platform 220 may obtain, from a third data source 210 (e.g., which may represent tens, hundreds, or even thousands of data sources), training information associated with a second set of entities, and may generate a data model using the training information. The training information may include information associated with a business and/or information associated with one or more employees of the business (e.g., information described above, financial terms, etc.). The training information may include information associated with the target entity, the set of related entities, a set of unrelated entities, and/or the like. By using the training information to generate a data model, AML platform 220 may use the data model to determine whether the target entity and/or the one or more related entities are engaging in money laundering, as described further herein.

In some implementations, AML platform 220 may standardize the training information. For example, AML platform 220 may standardize the training information to allow the training information to be processed to generate a data model. In this case, the training information may be associated with different file types, different file formats, and/or the like, and AML platform 220 may apply a standardization technique to allow the training information to be stored in a uniform format. In some implementations, AML platform 220 may apply different standardization techniques for different file types and/or file formats. By standardizing the training information, AML platform 220 may use the training information to generate a data model.

In some implementations, AML platform 220 may generate a data model. For example, AML platform 220 may, based on training information and a training dictionary, generate a data model using a deep learning analysis technique. The training dictionary may include a collection of words and phrases that are associated with scores (e.g., sentiment scores, such as positive sentiment scores or negative sentiment scores). As an example, AML platform 220 may generate a data model using a recurrent neural network and a bag of words technique.

In some implementations, AML platform 220 may use machine learning techniques to analyze the training information to generate a model. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like. In some implementations, AML platform 220 may use another kind of computer-implemented technique, such as artificial intelligence, machine perception, computer vision, or the like, to analyze the training information and generate a model.

In some implementations, AML platform 220 may generate a model using large quantities of data. For example, AML platform 220 may use a machine learning technique to analyze large quantities of data (e.g., terabytes, petabytes, etc.) to generate a model. In this case, the large quantities of data may be such that a human operator may be objectively unable to analyze.

In this way, AML platform 220 generates a data model that may be used to determine whether the target entity and/or the one or more related entities are engaging in money laundering.

As shown in FIG. 5, process 500 may include validating the data model using test information associated with a third set of entities (block 520). For example, AML platform 220 may obtain, from a fourth data source 210 (e.g., which may represent tens, hundreds, or even thousands of data sources), test information associated with a third set of entities that may be used to validate the data model. The test information may include information associated with a business and/or information associated with one or more employees of the business, and/or the like.

In some implementations, AML platform 220 may validate the data model. For example, AML platform 220 may validate the data model by using test information as input for the data model. In this case, the data model may process the test information to output a scored set of words or phrases. As an example, assume the test information is associated with an entity that has been proven to be involved in money laundering. In this case, if the data model outputs a score that indicates that the entity is involved in money laundering, then AML, platform 220 may validate the data model. If the data model outputs a score that indicates that the entity is not involved in money laundering, then AML platform 220 may obtain additional information that may be used to re-train the data model. In some implementations, AML platform 220 may continue to use test information to validate the data model until the output of the data model satisfies a threshold level of accuracy.

By validating the data model, AML platform 220 is able to make accurate money laundering determinations relative to applying a data model that has not been validated.

As further shown in FIG. 5, process 500 may include determining whether the target entity and/or the one or more related entities are engaging in money laundering (block 530). For example, AML platform 220 may use the data model to determine scores (e.g., sentiment scores) that may indicate whether the target entity and/or the one or more related entities are engaging in money laundering. A score may indicate a probability of the target entity or a related entity engaging in money laundering. As an example, a scale of 0-4 may be used, where a score of 0 indicates a very low probability, a score of 1 indicates a low probability, a score of 2 indicates a neutral probability, a score of 3 indicates a high probability, and a score of 4 indicates a very high probability. Other scales of scores may be used in other examples.

In some implementations, AML platform 220 may determine whether an entity (e.g., the target entity, a related entity, etc.) is engaging in money laundering by using information included in the graph data structure as input for the data model. For example, AML platform 220 may provide a node value included in the graph data structure as input for the data model, and the data model may output a score for the entity that indicates a probability of the entity being involved in money laundering. In this way, AML platform 220 is able to use the graph data structure and the data model to determine whether an entity is engaging in money laundering.

In some implementations, AML platform 220 may determine whether an entity is engaging in money laundering by using the data model to identify a trend. For example, assume AML platform 220 uses the data model to process a node of the graph data structure and determines that the entity associated with the node has a high probability (but not a very high probability) of engaging in money laundering. In this case, AML platform 220 may use the data model to analyze information relating to the entity over a time interval to identify a trend that may confirm or deny the entity's involvement in money laundering.

In some cases, AML platform 220 may use a bag of words technique and a recurrent neural network (RNN) to determine a trend (e.g., a sentiment trend, such as values indicating a trend in a positive sentiment direction or in a negative sentiment direction). For example, assume AML platform 220 trains the RNN (i.e., the data model) using a domain-specific dictionary (e.g., the bag of words technique) and training information. In this case, AML platform 220 may use the domain-specific dictionary to determine scores (e.g., sentiment scores) for particular words associated with an entity and may use the RNN to determine labels (e.g., sentiment labels) for particular phrases associated with the entity. Furthermore, AML platform 220 may analyze the scores and labels to determine a trend that may confirm or deny the entity's involvement in money laundering.

By determining scores and trends, AML platform 220 is able to determine whether the target entity and/or the one or more related entities are engaging in money laundering.

As further shown in FIG. 5, process 500 may include providing, to an interested party, a recommendation indicating whether the target entity and/or the one or more related entities are engaging in money laundering (block 540). For example, AML platform 220 may generate a recommendation based on the scores and trends, and may provide the recommendation to an interested party (e.g., by providing the recommendation for graphical display on a user interface). An interested party may be a financial institution, a law enforcement agency, an insurance provider, and/or the like.

In some implementations, AML platform 220 may generate a recommendation indicating whether the target entity and/or the one or more related entities are engaging in money laundering. For example, if a score indicates a high or very high probability of money laundering, AML platform 220 may generate a recommendation indicating that the target entity and/or the one or more related entities are engaging in money laundering. If a score indicates a low or very low probability of money laundering, AML platform 220 may generate a recommendation indicating that the target entity and/or the one or more related entities are not engaging in money laundering. In some implementations, AML platform 220 may generate a recommendation indicating a likelihood of the target entity and/or the one or more related entities engaging in money laundering, and may use the score as a confidence level value. In some implementations, AML platform 220 may generate a recommendation based on a trend.

In some implementations, AML platform 220 may provide a recommendation that includes a statement identifying the entity as engaging in money laundering as well as additional information that may be useful in preventing additional money laundering and/or in convicting the entity of money laundering. The additional information may include information associated with one or more money laundering statutes or laws to which the entity may be in violation, location information associated with one or more individuals involved in the money laundering (e.g., as obtained via the one or more individuals social media accounts), information suggesting one or more additional actions to take to prevent subsequent acts of money laundering, and/or the like. In some implementations, AML platform may analyze the score indicating that an entity or an individual is engaging in money laundering, and may select a particular action to include in the recommendation based on whether the score satisfies a threshold (e.g., a score with a higher probability of money laundering may be associated with a more severe or more direct action).

As an example, assume AML platform 220 determines that an individual associated with an entity is engaging in money laundering. Further assume that the individual posts on a social media account to indicate a geographic location of the individual. In this case, AML platform 220 may generate a recommendation for a police department in close physical proximity to the geographic location of the individual, allowing the police department to arrest or further investigate the individual engaging in money laundering. In this way, AML platform 220 provides a recommendation that identifies an entity as a money launderer and that includes additional information used to prevent additional money laundering and/or to convict the individual of money laundering.

As another example, AML platform 220 may provide an all-points bulletin (APB) to policy officials. For example, AML platform 220 may provide a recommendation to police officials indicating that an individual is engaging in money laundering, and may provide additional information as part of an APB to alert particular officers that the individual is engaging is money laundering.

As another example, AML platform 220 may provide a recommendation to a financial institution, such as a bank. For example, AML platform 220 may provide a recommendation to a bank indicating that an individual is engaging in money laundering, and may provide additional information suggesting that a bank manager freeze an account (e.g., a bank account, a credit card account, etc.) of the individual.

As another example, AML platform may provide a recommendation to the entity to which is losing money as a result of money laundering. For example, AML platform 220 may provide a recommendation to the entity indicating that an individual employed by the entity is engaging in money laundering, and may provide additional information suggesting that the entity freeze all accounts associated with the individual (e.g., credit card access to a business account, card access to a building, etc.).

As another example, AML platform 220 may provide a recommendation to a judicial agency. For example, AML platform 220 may provide a recommendation indicating that an individual is engaging in money laundering, and may provide additional information such as an electronic warrant. In this case, AML platform 220 may automatically populate one or more cells of the electronic warrant, thereby allowing an officer of the judicial agency to quickly process and carry out the warrant.

By generating a recommendation and providing the recommendation to an interested party, AML platform 220 is able to alert an interested party so as to prevent additional acts of money laundering.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, AML platform 220 is able to use machine learning techniques to process large volumes of data, thereby reducing a rate of false positives and improving the accuracy of money laundering determinations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device and from a first data source, information associated with a first set of entities involved in a money laundering investigation,
      the information associated with the first set of entities including target entity information for a target entity and related entity information for a set of related entities;
   obtaining, by the device and from a second data source, additional information associated with the target entity and/or the set of related entities;
   determining, by the device, one or more relationships between the target entity and the set of related entities,
      the one or more relationships indicating a degree of similarity between the target entity and the set of related entities;
   generating, by the device, a graph data structure that associates the target entity and the set of related entities using the one or more relationships;
   obtaining, by the device, training information from a third data source,
      the training information including a collection of words and phrases that are associated with sentiment scores;
   applying, by the device, one or more standardization techniques to store the training information in a unified format,
      the training information including one or more file types or file formats;
   generating, by the device, a data model using the training information after applying the one or more standardization techniques;
   validating, by the device, the data model using test information to verify that the data model correctly predicts that an entity engaged in money laundering, the test information being from a fourth data source and including information associated with an entity involved in money laundering;
   retraining, by the device, the data model based on determining that the data model did not correctly predict that the entity engaged in money laundering;
   processing, by the device, the retrained data model using data from the graph data structure as input into the retrained data model;
   determining, by the device, a score for the target entity and/or a set of scores for the set of related entities using the retrained data model,
      the score and/or the set of scores to identify whether the target entity and/or the set of related entities are likely to be money launderers; and
   generating and providing, by the device, a recommendation indicating whether the target entity and/or the set of related entities are likely to be engaging in money laundering based on determining the score and/or the set of scores.

2. The method of claim 1, where the target entity information, the related entity information, and/or the additional information includes information associated with a business and/or information associated with an employee of the business,
   the information associated with the business including at least one of:
      information indicating a business name,
      information indicating a field in which the business operates, or
      information indicating a geographic location in which the business operates, or
   the information associated with the employee of the business including at least one of:
      information indicating an employee name, or
      information indicating an employee job title.

3. The method of claim 1, where the second data source includes a news data source, a social media data source, and/or an internal data source of an entity associated with the money laundering investigation.

4. The method of claim 1, further comprising:
   analyzing, by the device, the information associated with the first set of entities to identify one or more related entities of the set of related entities as money laundering candidates.

5. The method of claim 1, further comprising:
   analyzing the additional information to identify one or more additional related entities and/or one or more additional relationships between the target entity and the one or more related entities;
   updating the graph data structure to include information associated with the one or more additional related entities and/or the information associated with the one or more additional relationships;
   determining one or more scores for the one or more additional related entities using the retrained data model; and
   providing another recommendation indicating whether the one or more additional related entities are likely to be engaging in money laundering.

6. The method of claim 1, further comprising:
   determining a set of relevancy scores for a set of edges included in the graph data structure,
   determining that one or more relevancy scores of the set of relevancy scores satisfy a relevancy threshold, and removing one or more edges and/or one or more nodes associated with the one or more relevancy scores that satisfy the relevancy threshold.

7. The method of claim 1, further comprising:
analyzing the training information using machine learning techniques.

8. A non-transitory computer-readable medium storing instructions, the instructions comprising:
one or more instructions that, when executed by one or more processors, cause the one or more processors to:
obtain, from a first data source, information associated with a first set of entities involved in a money laundering investigation,
the information associated with the first set of entities including target entity information for a target entity and related entity information for a set of related entities;
obtain, from a second data source, additional information associated with the first set of entities involved in the money laundering investigation;
determine one or more relationships between the target entity and the set of related entities,
the one or more relationships indicating a degree of similarity between the target entity and the set of related entities;
generate a graph data structure that associates the target entity and the set of related entities using the one or more relationships;
obtain training information from a third data source,
the training information including a collection of words and phrases that are associated with sentiment scores;
apply one or more standardization techniques to store the training information in a unified format,
the training information including one or more file types or file formats;
generate a data model using the training information after applying the one or more standardization techniques;
validate the data model using test information to verify that the data model correctly predicts that an entity engaged in money laundering,
the test information being from a fourth data source and including information associated with an entity involved in money laundering;
retrain the data model based on determining that the data model did not correctly predict that the entity engaged in money laundering;
analyze a set of nodes included in the graph data structure to determine a set of scores based on the retrained data model; and
provide a recommendation indicating whether the target entity and/or the set of related entities are likely to be engaging in money laundering based on the set of scores.

9. The non-transitory computer-readable medium of claim 8, where the one or more instructions, that cause the one or more processors to determine the one or more relationships, cause the one or more processors to:
compare the target entity information and the related entity information associated with a related entity of the set of related entities,
determine whether a social distance between the target entity and the related entity satisfies a threshold social distance, and
identify a relationship of the one or more relationships based on determining that the social distance between the target entity and the related entity satisfy the threshold social distance.

10. The non-transitory computer-readable medium of claim 8, where the one or more instructions, that cause the one or more processors to determine the one or more relationships, cause the one or more processors to:
compare the target entity information and the related entity information associated with a related entity of the set of related entities,
determine the degree of similarity between the target entity and the related entity based on comparing the target entity information and the related entity information associated with the related entity, and
assign, to the related entity, a weight value indicating the degree of similarity between the related entity and the target entity.

11. The non-transitory computer-readable medium of claim 8, where the one or more instructions, when executed by the one or more processors, further cause the one or more processors to:
compare the additional information and one or more nodes and edges of the graph data structure;
determine that the additional information satisfies a threshold level of similarity with the one or more nodes and edges of the graph data structure; and
verify the one or more nodes and edges of the graph data structure based on determining that the additional information satisfies the threshold level of similarity.

12. The non-transitory computer-readable medium of claim 8, where the one or more instructions, that cause the one or more processors to analyze the set of nodes included in the graph data structure, cause the one or more processors to:
provide a node value included in the graph data structure as input for the retrained data model,
analyze the node value using the retrained data model, and
determine a score based on using the retrained data model to analyze the node value,
the score to be used to determine whether the target entity and/or the set of related entities are likely to be engaging in money laundering.

13. The non-transitory computer-readable medium of claim 8, where the one or more instructions, that cause the one or more processors to obtain the training information from the third data source cause the one or more processors to:
obtain, from the third data source, the training information, the training information being associated with a second set of entities,
the third data source being a news data source or a social media data source, and
the training information including financial terms;
where the one or more instructions, that cause the one or more processors to generate the data model using the training information, cause the one or more processors to:
generate the data model using the training information associated with the second set of entities, a deep learning analysis technique, and a bag of words technique; and
where the one or more instructions, that cause the one or more processors to analyze the set of nodes included in the graph data structure, cause the one or more processors to:

determine the set of scores by using the set of nodes of the graph data structure as input for the retrained data model,
    the set of scores indicating whether node values in the graph data structure are associated with positive sentiment scores or negative sentiment scores.

14. The non-transitory computer-readable medium of claim 8, where the one or more instructions, that cause the one or more processors to analyze the set of nodes to determine the set of scores, cause the one or more processors to:
    analyze the set of nodes over a time interval to determine the set of scores,
        the set of scores indicating whether node values in the graph data structure are trending in a positive sentiment direction or in a negative sentiment direction during the time interval; and
    where the one or more instructions, that cause the one or more processors to provide the recommendation, cause the one or more processors to:
        provide the set of scores for graphical display on a user interface of a device.

15. A platform, comprising:
    a processor; and one or more computing resources to:
        obtain, from a first data source, information associated with a first set of entities involved in a money laundering investigation,
            the information including target entity information for a target entity and related entity information for a set of related entities;
        analyze the target entity information and the related entity information to identify one or more related entities of the set of related entities as money laundering candidates;
        determine one or more relationships between the target entity and the one or more related entities,
            the one or more relationships indicating a degree of similarity between the target entity and the one or more related entities;
        generate a graph data structure that associates the target entity and the one or more related entities using the one or more relationships;
        obtain training information from a second data source,
            the training information including a collection of words and phrases that are associated with sentiment scores;
        apply one or more standardization techniques to store the training information in a unified format,
            the training information including one or more file types or file formats;
        generate a data model using the training information after applying the one or more standardization techniques;
        validate the data model using test information to verify that the data model correctly predicts that an entity engaged in money laundering,
            the test information being from a third data source and including information associated with an entity involved in money laundering;
        retrain the data model based on determining that the data model did not correctly predict that the entity engaged in money laundering;
        determine a score for the target entity and one or more scores for the one or more related entities based on the retrained data model; and
        provide a recommendation indicating whether the target entity and/or the one or more related entities are likely to be engaging in money laundering.

16. The platform of claim 15, where the one or more computing resources are to:
    analyze additional information to identify information relevant to the money laundering investigation; and
    update a set of nodes included in the graph data structure to store the information relevant to the money laundering investigation.

17. The platform of claim 15, where the one or more computing resources are to:
    analyze the target entity information and/or the related entity information for a related entity of the one or more related entities to determine a degree of similarity between the target entity and the related entity,
    assign, to the related entity, a weight value indicating the degree of similarity between the related entity and the target entity.

18. The platform of claim 15, where the one or more computing resources are to:
    analyze the target entity information and the related entity information to determine semantic relationships between the target entity and the one or more related entities.

19. The platform of claim 15, where the one or more computing resources are to:
    determine the score for the target entity and/or the one or more scores for the one or more related entities using the retrained data model.

20. The platform of claim 15, where the one or more computing resources, when analyzing the training information to generate the data model, are to:
    analyze the training information using:
        artificial intelligence,
        machine perception, or
        computer vision.

* * * * *